No. 676,265. Patented June 11, 1901.
A. LINDGREN.
WHEELED PLOW.
(Application filed Dec. 26, 1900.)

(No Model.) 4 Sheets—Sheet 1.

Witnesses

Inventor
August Lindgren
B. P. Dodge
Attorney

No. 676,265. Patented June 11, 1901.
A. LINDGREN.
WHEELED PLOW.
(Application filed Dec. 26, 1900.)
(No Model.) 4 Sheets—Sheet 2.

Witnesses
Inventor
August Lindgren
B. P. T. Dodge
Attorney

THE NORRIS PETERS CO., PHOTO-LITHO., WASHINGTON, D. C.

No. 676,265. Patented June 11, 1901.
A. LINDGREN.
WHEELED PLOW.
(Application filed Dec. 26, 1900.)
(No Model.) 4 Sheets—Sheet 3.
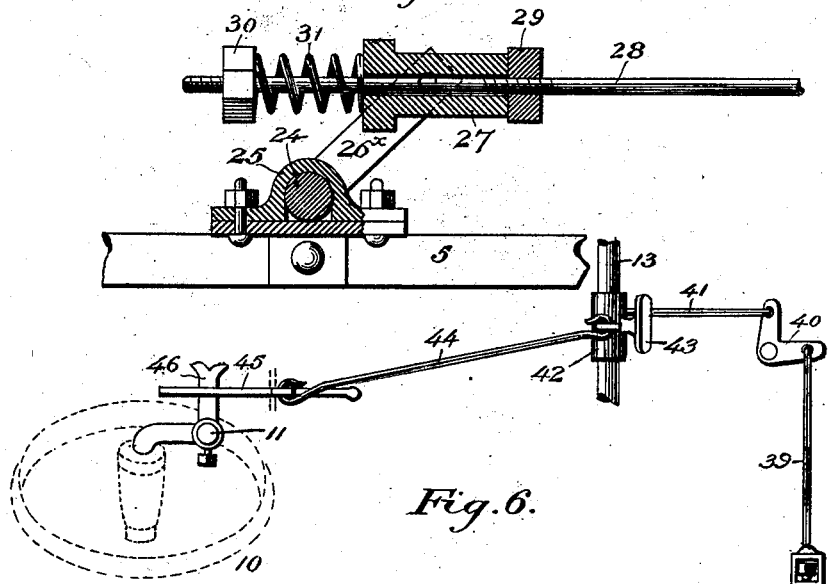
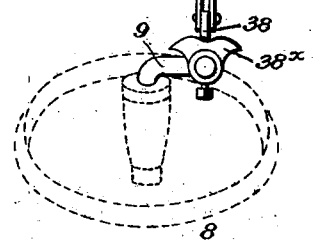
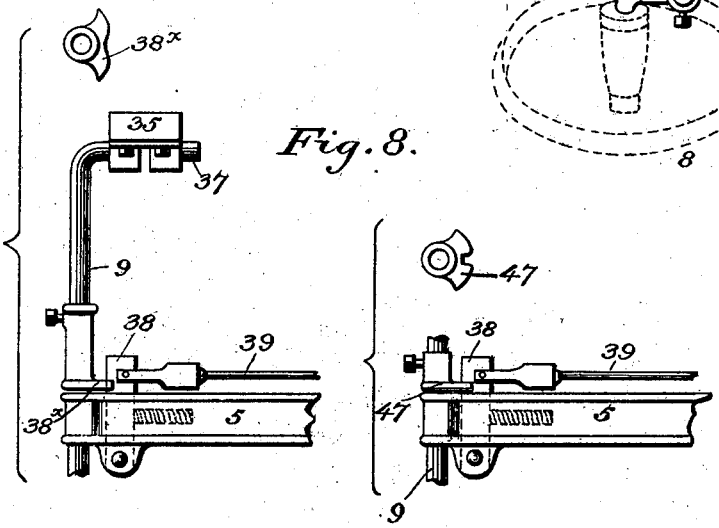
Witnesses
F. S. Elmore
N. R. Kennedy
Inventor
August Lindgren
By P. T. Dodge Attorney No. 676,265. Patented June 11, 1901.
A. LINDGREN.
WHEELED PLOW.
(Application filed Dec. 26, 1900.)
(No Model.) 4 Sheets—Sheet 4.

Witnesses
Inventor
Attorney

UNITED STATES PATENT OFFICE.

AUGUST LINDGREN, OF MOLINE, ILLINOIS, ASSIGNOR TO THE MOLINE PLOW COMPANY, OF ILLINOIS.

WHEELED PLOW.

SPECIFICATION forming part of Letters Patent No. 676,265, dated June 11, 1901.

Application filed December 26, 1900. Serial No. 41,068. (No model.)

*To all whom it may concern:*

Be it known that I, AUGUST LINDGREN, of Moline, county of Rock Island, and State of Illinois, have invented a new and useful Improvement in Wheeled Plows, of which the following is a specification.

This invention has reference to wheeled plows; and it consists of various improvements directed to the form and construction of the frame, the manner of adjusting and "leveling" the plow-beam, the means for controlling the caster-wheels, and to various other details, as will be fully described in the specification and pointed out in the claims.

Figure 1:
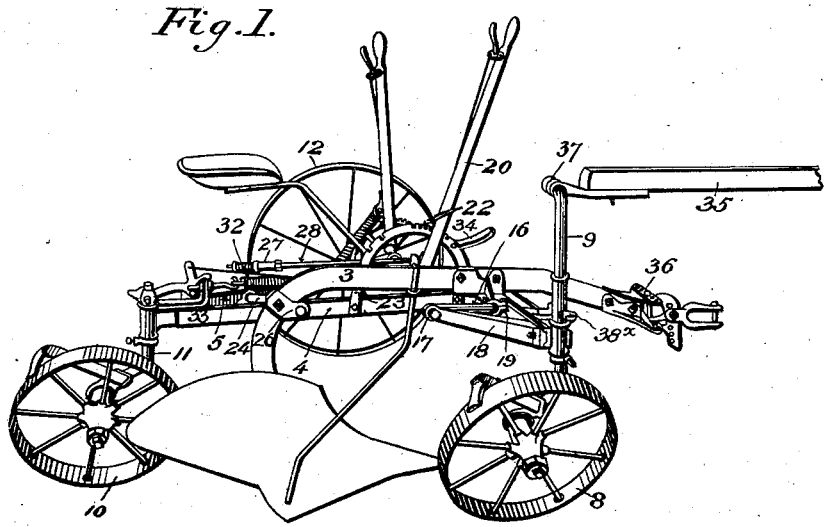
Figure 2:
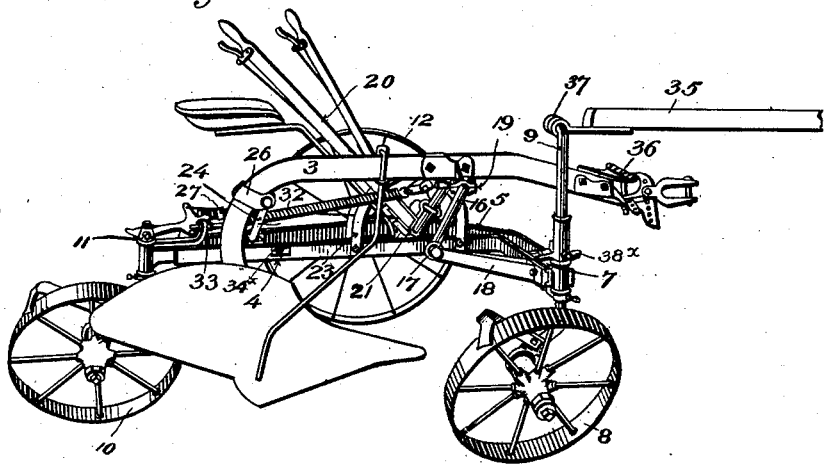
Figure 3:
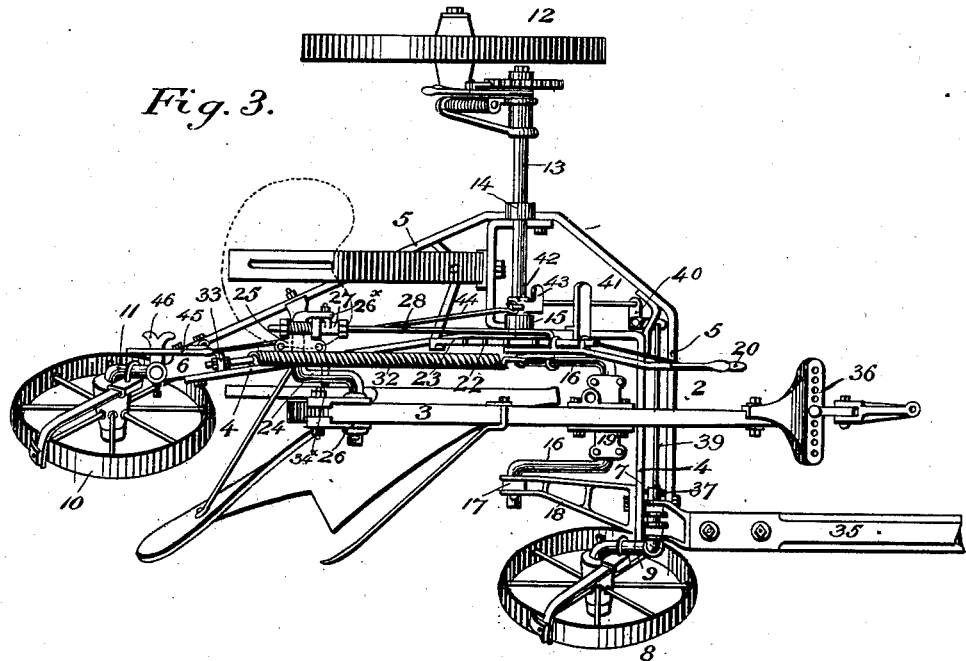
Figure 4:
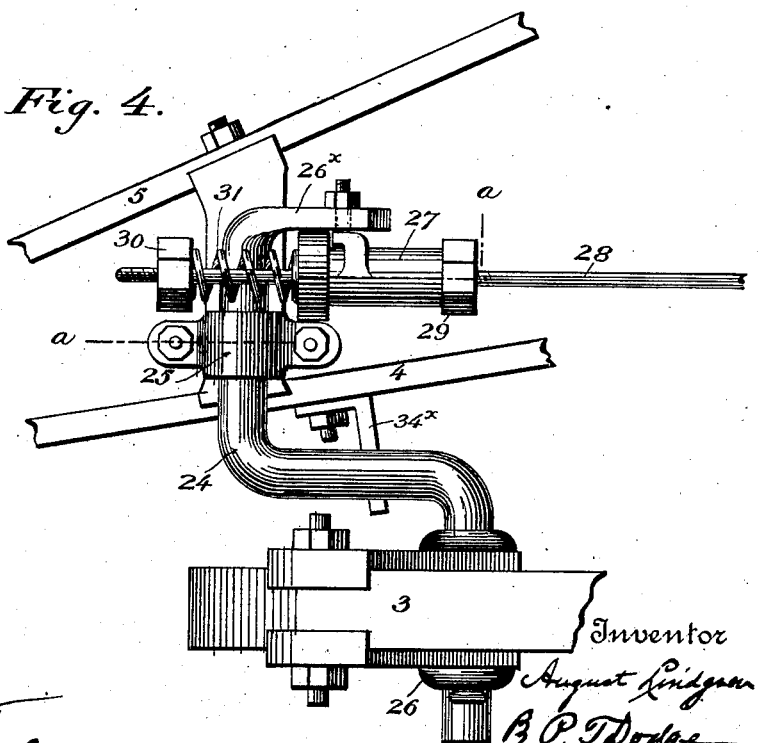
Figure 9:
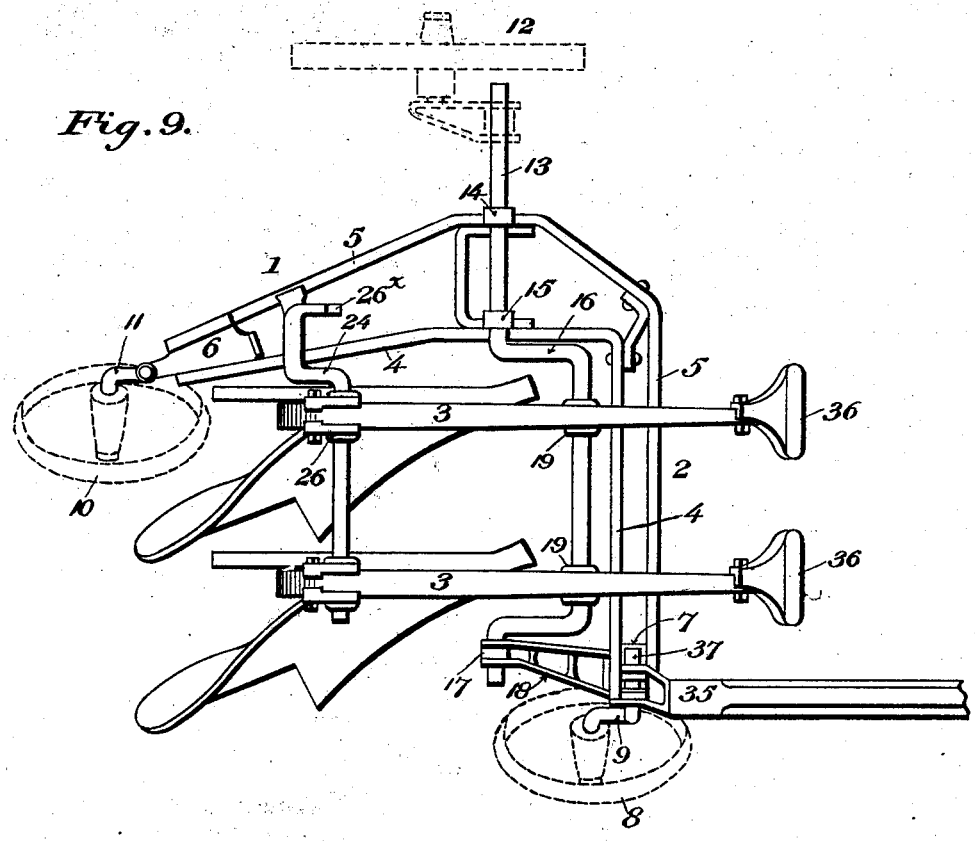

In the accompanying drawings, Figure 1 is a perspective view of my improved plow with the beam lowered. Fig. 2 is a similar view with the plow raised out of the ground. Fig. 3 is a top plan view of the same. Fig. 4 is a plan view, on an enlarged scale, of the rear portion of the beam, the frame, and the crank connection between the two. Fig. 5 is a sectional elevation on the line $a\ a$ of the preceding figure. Fig. 6 is a plan view of the two caster-wheels, their locking devices, and the operating mechanism for the latter. Fig. 7 is a vertical sectional elevation of the locking device for the front wheel. Fig. 8 is a similar view of an alternative construction to be employed to lock the wheel when the tongue is omitted. Fig. 9 is a plan view of the frame of the machine in modified form, showing how a gang of plow-beams may be supported.

Referring to the drawings, the frame of the machine is preferably of metal and comprises the longitudinally-extending main portion 1 and the lateral extension 2, the plow-beam 3 extending at the side of the longitudinal portion and above and across the lateral extension, as clearly shown in Fig. 3. This frame is composed of the inner bar 4, extending longitudinally and then bent laterally at its front end, and the bar 5 extending obliquely alongside the longitudinal portion of the bar 4 and parallel to and in front of the lateral extension of the same. These bars are connected and held in fixed relation at their rear ends by a filling block or casting 6, firmly bolted between them, and at their front ends by a block or casting 7, similarly held in place, as shown in Fig. 2. The frame is sustained at its forward end to one side by a caster-wheel 8, carried on the lower bent end of a vertical stem 9, mounted loosely in a bearing fixed on the end of the lateral extension of the frame, the arrangement being such that this caster-wheel will have a swiveling motion in the frame. At its rear end the frame is sustained by a rear caster-wheel 10, carried on the lower bent end of a vertical stem 11, mounted loosely in a bearing fixed on the rear end of the frame, the said stem being capable of a swiveling action. The land side of the frame is sustained by a land-wheel 12, carried on an adjustable cranked end of a horizontal axle 13, mounted in bearings 14 and 15 in the frame-bars 5 and 4, respectively, and bent at the side of the bar 4 in the form of a crank or bail 16, having its outer end mounted in a bearing 17 on the rear end of a horizontal casting or bracket 18, projecting rearwardly from the lateral extension of the frame. The central portion of the bail extends beneath the plow-beam and is mounted loosely in a bearing 19 on the beam, so that when the axle is rocked in its bearings on the frame the beam will be raised or lowered. The axle is rocked to thus raise and lower the beam by a hand-lever 20, firmly bolted to casting 21, which is in turn fixed to one side of the bail, the lever being provided with a latch or dog adapted to engage teeth 22 in a segment-bar 23, rising from the inner frame-bar, the purpose of which is to provide for locking the beam in the desired position.

In order that when the lever is operated to raise or lower the beam the latter will be maintained in a horizontal position, or, in other words, the leveling of the plow may be effected, I connect the rear end of the beam with the frame by a crank 24, mounted in a bearing 25, near the rear end of the frame, and having one end mounted loosely in a bearing 26 on the under side of the plow-beam and its other end bent laterally in a vertical plane, as at $26^\times$. To this laterally-bent end of the crank-arm is pivoted on a horizontal axis a sleeve 27, Figs. 4 and 5, provided with an opening in which loosely extends the rear end of a rod 28, whose forward end is jointed to the casting 21 on the forward bail. This rod has a limited movement within the sleeve controlled by a nut 29 on the rod in front of the sleeve and a head 30 and spring 31 on the rod in rear of the sleeve, the purpose of which construction will presently appear.

By the construction described it will be seen that when the hand-lever is pulled rearward the axle will be turned in its bearings and the bail 16 turned upward, the crank 24, by reason of its connection with the lever and beam, being also turned upward and the beam raised bodily in a horizontal position, the lifting motion being assisted by a spiral spring 32, attached at its forward end to the casting 21 and at its rear end to the frame, as at 33. The parts may now be locked by the latch on the hand-lever engaging the teeth in the segment-bar. When the plow is to be lowered in the ground, the lever is released and pushed forward, a reverse action of the bail and crank taking place and the beam descending and lowering the plow into the ground, the latter at all times occupying a horizontal level position.

In plowing in "rough" or "strong" ground it is desirable that the plow be free to rise in encountering obstructions, and to meet these conditions I propose to render the locking-latch for the hand-lever inoperative. This is accomplished by means of a movable guard-plate 34, Fig. 1, hinged to the segment-bar and adapted to be adjusted to cover the teeth therein and serving to prevent the latch from engaging the teeth. Under these conditions the weight of the beam and plow will hold the latter in the ground, the parts being sustained yieldingly by the lifting-spring, so that the plow will override obstructions. In the event of the plow encountering obstructions it will rise slightly, the beam rising at its rear end and fulcruming on its front connection with the bail. This motion of the beam is cushioned and the shocks taken up by the spiral spring 31 before alluded to as encircling the rod 28 between the sleeve 27 and head 30. The vertical movement of the rear end of the beam will move the lateral end of the crank-arm and sleeve rearward in relation to the rod, and the spring will serve to cushion this action and take up the shocks due to this motion. In order that the plow-beam when thus released by its locking-lever may be prevented from descending too far into the ground, I provide a stop in the form of a projection $34^\times$ on the inner bar of the frame in position to be encountered by the crank 24 when the latter moves downward on the descent of the beam.

The machine, as shown in the drawings, may have the draft-team hitched either to the tongue 35 or the tongue may be omitted and the team hitched to a clevis 36 on the end of the beam. When the tongue is employed, it is attached to a horizontal lateral extension 37 of the stem of the front caster-wheel, which latter and the rear caster-wheel are so locked that the rear wheel will be automatically released when the tongue is turned by the team in rounding corners.

The front caster-wheel is locked by a swinging spring-latch 38, pivoted to the frame adjacent to the stem of the wheel and adapted to engage in a depression in a cam-plate $38^\times$ on the stem, Fig. 7. This latch is connected by a rod 39, Fig. 6, with one arm of an elbow-lever 40, mounted on the frame, the other arm of which is connected by a rod 41 with a rocking plate 42, loosely encircling the axle and formed with a foot-trip 43. The rocking plate is connected by a rod 44 with an upwardly-extending arm on a spring-latch 45, mounted on a horizontal transverse axis and formed with a rearwardly-extending arm provided with a notch embracing a horizontal arm 46, projecting from the upper end of the stem of the rear caster-wheel. From this construction it will be observed that if the latch 38 is swung on its pivot the elbow-lever 40 will be rocked, and turning the rocking plate the rod 44 will be drawn forward, which action will lift the notched arm of the latch 45 and release the rear wheel. The swinging of the latch 38 to effect this unlocking action is accomplished by the cam-plate $38^\times$, which on each side of the depression curves outward in such manner that when the tongue is turned by the team beyond a predetermined point the latch will be forced back and through its connection with the rear latch will release the rear wheel. Ordinary lateral vibrations of the tongue will not by reason of the form of the cam affect the locking device, the latter being operated only when the tongue is turned beyond a predetermined point, as in rounding corners. After the corner is turned and the machine again advances the cam-plate is brought to its former position, with its depression opposite the latch, which latter will spring into place, the rear latch at the same time engaging the arm on the rear caster-wheel, which in the meantime had assumed a position in the line of travel.

When the tongue is omitted and the team hitched to the clevis on the beam, the cam-plate $38^\times$ is removed and a segment-plate 47, Fig. 8, substituted. This plate is provided with a central notch, in which the latch 38 engages and locks the wheel in the path of travel. When a corner is turned by the team, the driver presses with his foot on the trip 43 and turning the rocking plate 42 withdraws the latch 38 from the notch in the segment-plate and releases the front wheel, the rear latch being simultaneously operated and the rear wheel released. When the team again travels forward, the two wheels will follow in the line of travel and will be automatically locked in their former positions. It is seen, therefore, that in one case when the tongue is employed the front wheel is guided by the tongue and the rear wheel automatically released by the turning of the team, while in the other case when the tongue is omitted the two wheels are automatically released by the driver operating the rocking plate, the same connections between the two latches serving in the one case to release the rear wheel and in the other case to release both wheels.

By the use of the front caster-wheel when the tongue is omitted the machine may turn freely on its wheels and will not cramp or drag them sidewise.

I deem the peculiarly-formed frame with the lateral forward extension passing beneath the beam and giving support to one end of the axle of particular advantage in that by extending this lateral portion a gang of plows may be used, as shown in Fig. 9, with the beams extending side by side and all mounted on a rocking crank-axle, which may be supported at one end by the longitudinal framebars and at the other end by the bracket on the lateral extension of the frame.

Having thus described my invention, what I claim is—

1. In a wheeled plow the combination with ground-wheels, of a frame sustained thereby and formed with a longitudinally-extending main portion and a forward lateral extension, and a plow-beam sustained by the frame at the side of the main portion of the same and extending above the lateral extension of the frame.

2. In a wheeled plow the combination with a frame formed of a longitudinal main portion extended laterally at its forward end, of a plow-beam extending alongside the main portion of the frame and over the lateral extension of the same, and a crank or bail engaging the beam and having bearings respectively in the longitudinal and lateral portions of the frame.

3. In a wheeled plow the combination with a frame formed of a longitudinal portion and a lateral extension at its forward end, of a plow-beam extending alongside the longitudinal portion of the frame and over the lateral extension, a bracket extending rearward from the lateral extension, and a crank or bail engaging the beam and supported by the frame and the bracket.

4. In a wheeled plow the combination with the frame provided with the front lateral extension, of a plow-beam extending at the side of the frame and above the lateral extension, a crank or bail engaging the beam near its front end and having bearings respectively in the frame and the lateral extension, and a second crank or bail engaging the beam near its rear end and having a bearing in the frame.

5. In a wheeled plow the combination with the frame, of a plow-beam movable vertically at its rear end, and means for cushioning the vertical movement of the beam.

6. In a wheeled plow the combination with the frame, of the plow-beam, a crank or bail engaging the beam near its front end and mounted in bearings on the frame, a second crank or bail engaging the beam near its opposite end and also journaled in the frame, a rod having its forward end operatively connected with the forward bail, a sleeve pivoted to the rear bail and encircling the rod, a stop on the rod engaging the front end of the sleeve, a head on the rear end of the rod, and a spring encircling the rod between the sleeve and head.

7. In a wheeled plow the combination with the frame, of a vertically-movable plow-beam, a crank or bail journaled in the frame and jointed to the beam, and a stop on the frame in position to be encountered by the crank to limit the descent of the beam.

8. In a wheeled plow the combination with the frame, of a vertically-movable plow-beam, a bail journaled in the frame and engaging the beam near its forward end, a crank journaled in the frame and engaging the beam near its rear end, and a lateral stop on the frame in position to be encountered by the rear crank and serving to limit its downward movement.

9. In a wheeled plow the combination with the frame, of a front swiveling caster-wheel, a locking-latch therefor, a rear swiveling caster-wheel, a locking-latch for the same, an actuating device mounted on the frame, and adapted to be operated by the driver, and connections between said actuating device and both latches.

10. In a wheeled plow the combination with the frame, of a swiveling caster-wheel at its front, a locking-latch for the same, a caster-wheel at the rear, a locking-latch for the latter, a rocking plate in reach of the driver, a connection between the plate and the rear latch, an elbow-lever on the frame, a connection between one arm of the same and the rocking plate, and a connection between the other arm of the elbow-lever and the front latch.

11. The improved frame for a wheeled plow comprising an inner longitudinal bar bent laterally at its front end and a relatively fixed outer bar extending alongside the inner bar and also bent laterally at its forward end and extending in front of and parallel to the laterally-bent end of the inner bar.

12. The improved frame for a wheeled plow comprising an inner bar bent laterally at its forward end, and a relatively fixed outer bar extending alongside the inner bar and obliquely with reference to the same, and bent laterally at its forward end and extending in front of and parallel to the laterally-extended end of the inner bar.

13. In combination with a wheeled frame comprising a longitudinally-extending main portion and a forward lateral extension leaving a free open space in rear of the lateral extension and at the furrow side of the main portion, a vertically-movable beam extending at the side of the main portion of the frame in said free space, and a jointed connecting device between the beam and the frame, said connecting device being sustained at one side of the beam by the main portion of the frame and at the opposite side of the beam by the lateral extension of the frame; whereby a gang of beams may be assembled side by side in the free space at the side of the main portion of the frame and sustained by a single connecting device.

In testimony whereof I hereunto set my hand, this 17th day of November, 1900, in the presence of two attesting witnesses.

AUGUST LINDGREN.

Witnesses:
C. H. LIPPINCOTT,
L. C. BLANDING.